United States Patent
Van de Velde

(10) Patent No.: US 6,217,638 B1
(45) Date of Patent: Apr. 17, 2001

(54) PROCESS FOR CONTROLLING THE CLEANING OF A GRILLE FOR FILTERING THE COOLING AIR OF A RADIATOR PARTICULARLY OF ENGINES AND DEVICE FOR PRACTICING THE SAME

(76) Inventor: Marcel Jean Van de Velde, Clos Lagrange Rue Vice Amiral Gayral, 40000, Mont de Marsan (FR)

( * ) Notice: Subject to any disclaimer, the term of this patent is extended or adjusted under 35 U.S.C. 154(b) by 0 days.

(21) Appl. No.: 09/238,428
(22) Filed: Jan. 28, 1999

(30) Foreign Application Priority Data

Jan. 28, 1998 (FR) .................................................. 98 01175

(51) Int. Cl.$^7$ .................................................. B01D 46/00
(52) U.S. Cl. .................................................. 95/280
(58) Field of Search .................................................. 95/280

(56) References Cited

U.S. PATENT DOCUMENTS 3,716,968    2/1973  Mischke .

5,616,171 *  4/1997  Barris et al. .......................... 95/280

FOREIGN PATENT DOCUMENTS

| 29 23 465 | 12/1980 | (DE) . |
| 0 269 765 | 6/1988 | (EP) . |
| WO 95/07748 | 3/1995 | (WO) . |

* cited by examiner

Primary Examiner—Chester T. Barry
(74) Attorney, Agent, or Firm—Young & Thompson

(57) ABSTRACT

A process and apparatus for controlling the cleaning of a grille for filtering cooling air of a radiator particularly of engines, in which the cooling air is forced with the aid of a ventilation system and in which the cleaning is effected by blowing with the aid of at least jet cleaner assembly sweeping tangentially the surface of the grille. The jet cleaner assembly is controlled as a function of a parameter connected to the regime or the flow of the ventilation system and/or each time or the same time as the regime or flow falls to or below a predetermined level.

9 Claims, 2 Drawing Sheets

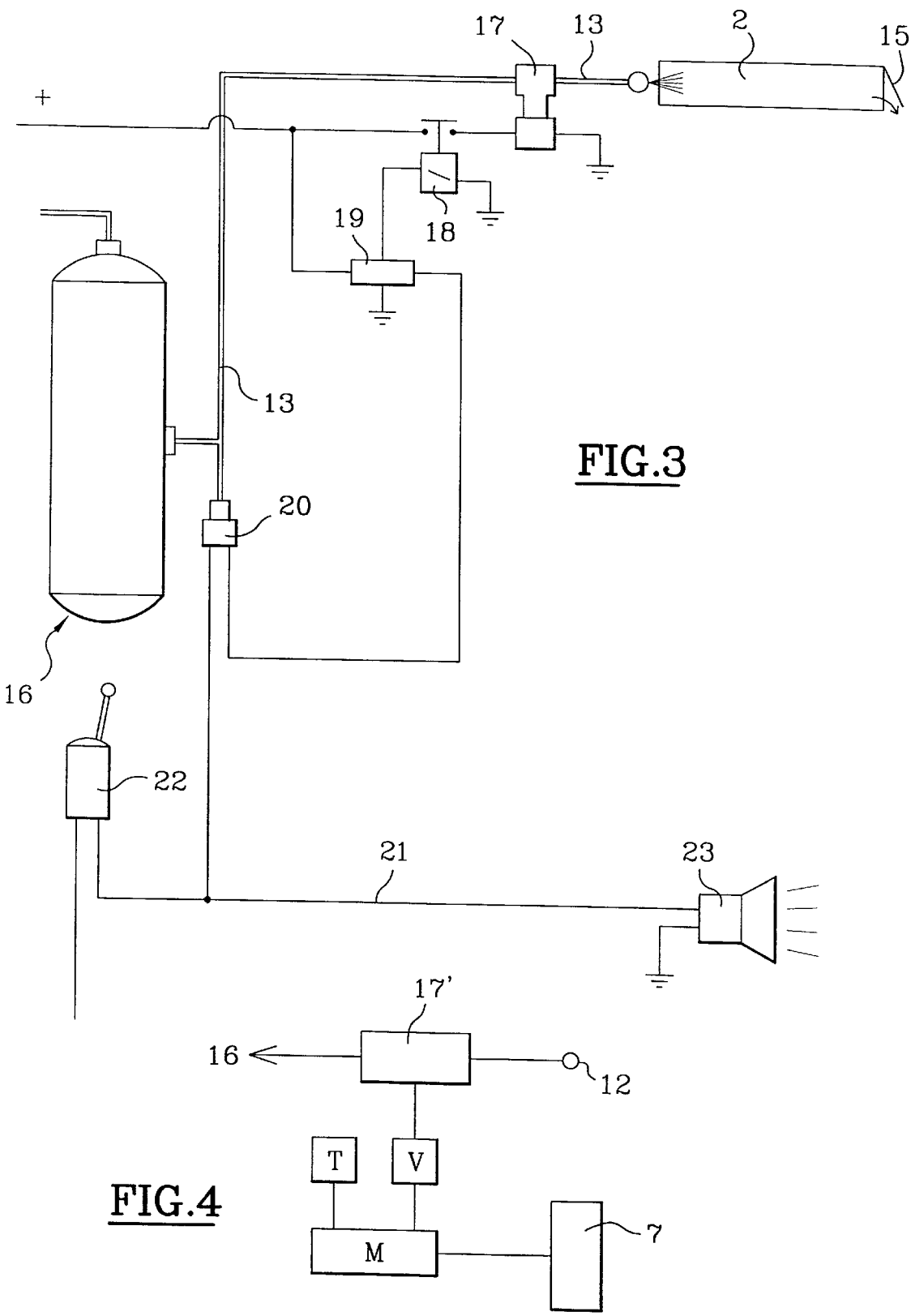

PROCESS FOR CONTROLLING THE CLEANING OF A GRILLE FOR FILTERING THE COOLING AIR OF A RADIATOR PARTICULARLY OF ENGINES AND DEVICE FOR PRACTICING THE SAME

FIELD OF THE INVENTION

The present invention relates to the cleaning of grilles for filtering the cooling air of radiators of gaseous and liquid fluids and more particularly of radiators for various engines working in dusty air loaded with solid particles suspended in the air.

BACKGROUND OF THE INVENTION

A typical application of the invention is for example cleaning the grilles of oil and water radiators of movable devices, such as loaders, compactors or graders for the treatment of waste or the compacting of soil.

The radiators of these devices are provided with grilles for filtering air that cools the radiators and which is forced through said grilles.

These are pierced with a large number of holes or passages of small dimensions through which the dust and solid particles in suspension in the air cannot pass, thereby more or less greatly obstructing the grilles.

Periodically, it is necessary to clean the surface of these filtering grilles, so as to eliminate the impurities which are held and retained thereon and various systems for cleaning these filtration grilles are already known, by brushing or blowing, whose principle is well known.

These cleaning systems are either difficult or even impossible to mount, because they are bulky, particularly on loaders, or complicated in design, use and maintenance.

SUMMARY OF THE INVENTION

The object of the invention is to provide a simple and effective means adapted to clean periodically these grilles in an automatic and effective manner.

To this end, the invention has for its object a process for controlling the cleaning of a grille for filtering the cooling air of a radiator, particularly of engines, through which the cooling air is forced by means of a ventilation system, the cleaning being carried out by blowing with the aid of at least one blower sweeping tangentially the surface of the grille, characterized in that it consists in controlling said blower as a function of a parameter connected to the regime or the flow of the ventilation system and/or each time or at the same time as said regime or flow falls to a predetermined level or below this latter.

According to an embodiment of the above process, more particularly adapted for engines of the loader type or the like, said parameter is a signal generated upon passage of the speed selector into a reverse movement position, this signal being adapted to be, in the case in which the engine is provided with a backup signal, the actuation current of this latter.

The invention also has for its object a device for practicing this process, adapted for an engine in which the cooling air is forced by the aid of a ventilation system, said device comprising a filtration grille, on at least one side of which is disposed a tangential blower and reserve of compressed air, connected to said blower via an electromechanical control device, characterized in that the filtration grille has a transverse cross-section of undulant profile, said blower having, at one of the ends of each groove in the form of a conduit formed by the grille, a jet or the like for sweeping the groove, and in that said control device of the blower is connected to means actuated as a function of the regime or of the flow of the ventilation system when said regime or flow is reduced to zero or nearly zero.

According to one application of the invention to engines, of the loader type or the like, provided or not with a backup signal and whose ventilation system is actuated by the engine motor, said means actuated as a function of the regime of the ventilation system are constituted by a timer activating for a predetermined time a relay for supplying an electrovalve permitting the sending of air under pressure into said blower, said timer being actuated by a signal generated by the speed selector of the engine, such that the blower will be operated each time the selector is actuated for reverse motion, which is to say concomitantly with the minimum regime of said ventilation system, the engine motor being decelerated.

Preferably, the blower is actuated only if the air pressure in said reservoir is above a predetermined level.

The device of the engine thus ensures cleaning both automatically and effectively, on the one hand thanks to the undulant configuration of the filtration grille, which increases the filtration surface and, on the other hand, by the placement of the jets of the blower at one end of the U-shaped grooves of the grille, thereby ensuring powerful tangential sweeping over all the surface of the groove and along all its length.

Such sweeping is systematically controlled as soon as, when the engine is actuated, the forced air ventilation regime for cooling of the radiator or radiators, with water or oil or any other liquid or gaseous fluid, is sufficiently low and particular when it is minimal, which is the case particularly at each manipulation of the speed change selector to move to reverse motion, the engine motor being necessarily decelerated and hence the ventilation system, connected to the motor regime of the engine, also operating at a minimum.

In the case of the use of the invention with engines of the loader type or the like, whose ventilation system is actuated independently of the motor of the engine, the control of the blower will be triggered for example from a preprogrammed control or not, periodic or not, or the ventilation system. This control of the ventilation system can consist, for example, of temporarily feathering, for about several seconds, the blades of the ventilation system, said feathering giving rise to actuation of said blower.

BRIEF DESCRIPTION OF THE DRAWINGS

Other characteristics and advantages will appear from the description which follows, of an embodiment of the process of the invention, which description is given solely by way of example and with respect to the accompanying drawings, in which:

FIG. 3 is a diagram of a preferred embodiment of the device of the invention applied to an engine provided with a sonic backup alarm; and FIG. 4 is a diagram of the control of a blower from an electrovalve, itself controlled from the actuating motor of the ventilating system.

DETAILED DESCRIPTION OF THE INVENTION

Figure 1:
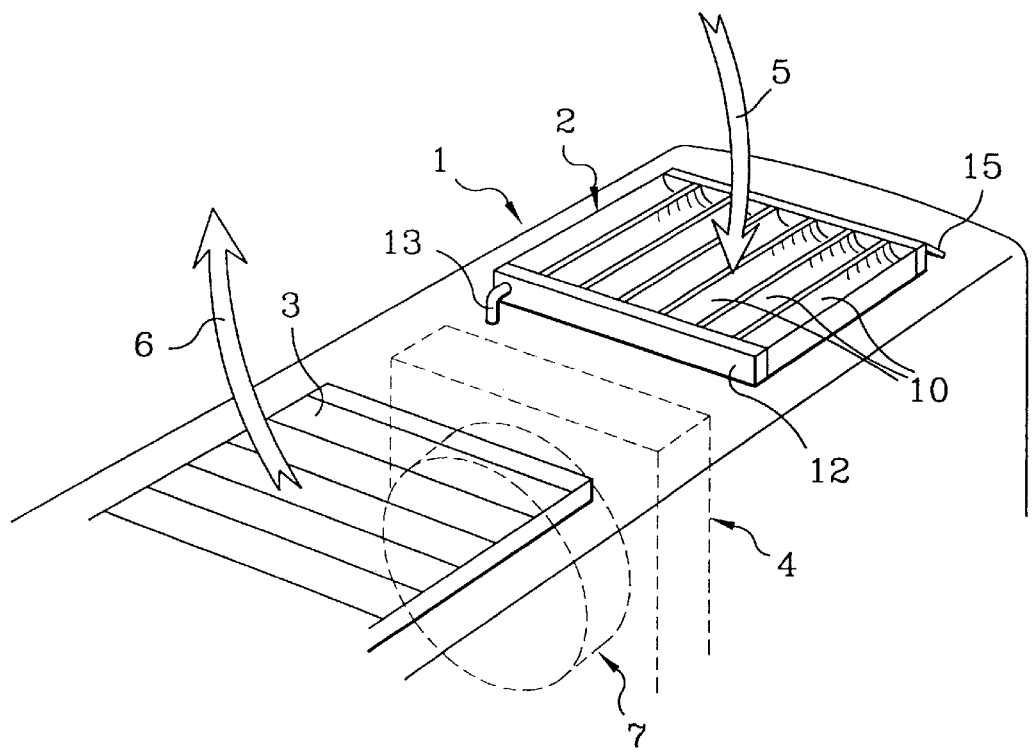
FIG. 1 is a fragmentary schematic view of an engine of the loader type.

In FIG. 1, there is shown schematically and partially the forward portion of a loader and more precisely the front upper portion of the cowl 1 of the motor, on the upper surface, substantially horizontal, of which open, at the front end, louvers for the introduction of air, covered by an air filtration grille 2 according to the invention.

There are downstream louvers for the grille 3, for the outlet of air.

Below the cowl 1, between the two grilles 2, 3, is located the radiator 4 for cooling water or any other type of fluid necessary for the engine.

The incoming air 5 is drawn in and forced through the grille 2, then from the radiator 4 and finally to the grille 3 to be discharged at 6, by means of a ventilation system symbolically indicated at 7, generally driven by the engine motor.

Figure 2:
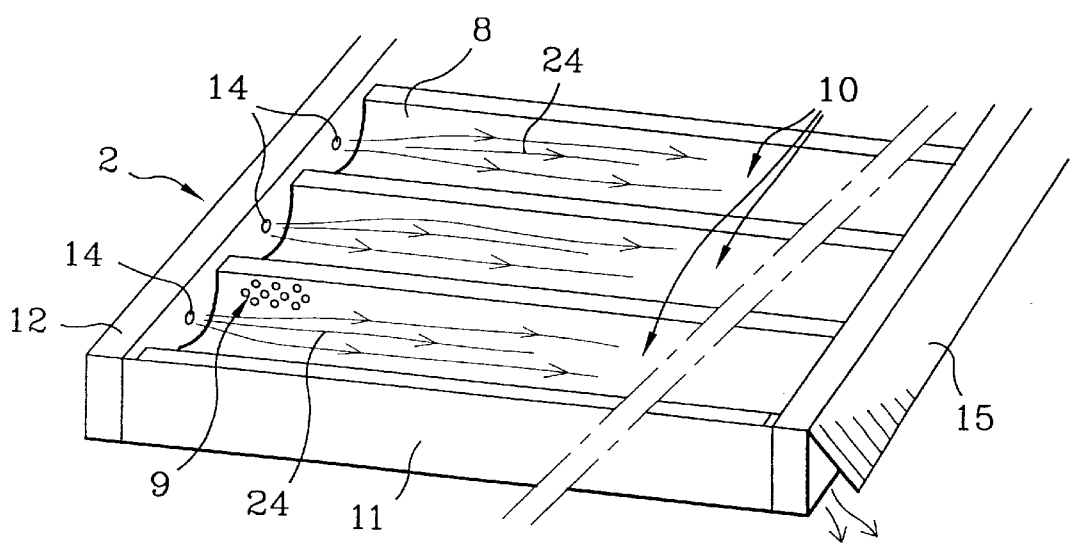
FIG. 2 is a fragmentary perspective view of a filtration grille according to the invention.

Referring to FIGS. 1 and 2, the grille 2 for filtration of the incoming air 5 is constituted by a metallic plate 8 pierced or opened by a large number of small holes 9 and bent so as to delimit the parallel grooves 10 in the form of conduits.

The plate 8 which thus has an undulant transverse profile, is fixed by any suitable means on a rectangular metallic frame 11, itself mounted on the cowl 1.

The grooves 10 are oriented in the direction of movement of the engine and are swept by air under pressure from a blower 12 disposed transversely to the grooves 10 at their end turned toward the rear of the cowl 1.

The blower 12 is integrated into the rear edge of the frame 11 and comprises a conduit (not shown) integrated into the frame and connected by a conduit 13 (FIG. 1) to a source of compressed air, typically the pressurized reserve with which engines of this type are conventionally provided.

Facing the inlet of each groove 10, the blower 12 is provided with jets 14 or the like.

At the forward end, the frame 11 is open to let the sweeping air escape, directed downwardly by a deflecting plate 15 fixed to the frame.

FIG. 3 is a diagram of the control means of the blower 12 according to the invention.

The blower 12 is connected by the conduit 13 to the pressurized air reservoir 16 of the engine, via an electrovalve controlled by a relay 18 itself actuated by a timer 19.

The timer 19 is connected, via a pressure contact 20 deriving from the conduit 13, a conductor 21 connecting the speed selector 22 of the engine to a sonic backup alarm 23 with which the latter is provided.

In normal operation of the engine, cooling air 5 drawn through the radiator 4 of the motor gives rise to a pressure on the external surface of the air filtration grill 8, leading to blocking of this latter by dust and various debris. During change to reverse movement operation of the motor, the drop in the motor regime gives rise practically to the disappearance of this pressure, thereby permitting, during this short time, to proceed automatically to cleaning of the grille by the device of the invention.

When the speed selector 22 is actuated for reverse motion, for safety reasons, a current is delivered to the sonic backup alarm 23 by the conductor 21.

This current, called a control current, is used according to the invention to actuate the timer 19 which itself ensures the current supply of the relay 18 for ten seconds for example, this duration being of course adjustable. This relay 18 delivers, during the same time lapse, the supply current to the electrovalve 17 which opens the passage of air under pressure toward the blower 12.

The jets, holes or nozzles 14, which are calibrated, send along the axes of the grooves 10 a powerful jet 24 sweeping tangentially all the surface of the grooves over all their length. This jet is even more efficacious because it is produced precisely at the moment in which the pressure holding the particles against the grille, occasioned by the forced air flow of the fan 7, is at a minimum, because the regime of this latter is directly connected to that of the motor, necessarily slowed down during speed change.

Each time the reverse drive of the engine is over, so will be automatically the pressure detected by the pressure contact 20, sufficient in the reservoir 16.

The pressure contact 20 avoids too frequent use which would empty the reserve of pressurized air. To a certain extent, it is optional and can be omitted if the reservoir 16 is sufficiently large.

The device of the invention is not only effective, but economical as to compressed air.

The parameter controlling the actuation of the electrovalve 17 is in this case the passage toward reverse movement of the engine. Under the usual conditions of use of these engines, the reverse movements are sufficiently numerous to ensure suitable cleaning.

It is to be noted that in the absence of a backup alarm 23, the speed selector 22 of the engine can be provided with means generating a signal each time there is change into reverse movement, this signal being sent to the pressure contact 20.

The above parameter is connected indirectly to the regime of fan 7, because the changes to reverse movement and to the minimum regime of the fan, are concomitant.

The parameter controlling the electrovalve 17 can be a parameter connected more directly to the regime of the fan 7.

Thus the electrovalve 17 could be controlled each time said regime reaches, when slowing down, a predetermined value or exceeds that predetermined value, for example with the aid of means indicating the speed of rotation of the fan, connected to the electrovalve.

This could be operated also in the case in which the fan 7 is not driven by the engine motor, but by an independent motor, which could be hydraulic or electrical for example.

FIG. 4 shows such a control of the electrovalve 17' supplied with air from the reservoir 16. To this end, a timer T controls for example periodically the momentary stopping of the motor M (electrical or hydraulic for example) for driving the fan 7. Each time the regime of the motor M, measured by a speed detector V, reaches when decreasing a predetermined threshold, which is adjustable, said detector V generates a signal controlling the actuation of said electrovalve 17', this latter being closed when the regime of the motor M again rises above said predetermined threshold.

Moreover, the electrovalve 17 of FIG. 3 could be controlled from a signal generated by the passage of the speed selector 22 to reverse movement, the signal controlling the actuator of the electrovalve 17, as well as the momentary stopping of the drive means of said fan 7. In this case, the control of the electrovalve 17 is retarded relative to the stopping control of the fan such that the electrovalve will be triggered only after the fan regime has reached a sufficiently low level, so as to take account of the inertia of the system.

Again in the case in which the fan 7 is not driven by the engine motor but by an independent motor, the blower 12 could be triggered for example from a preprogrammed control or not, periodical or not, of the ventilation system.

This control of the ventilation system could consist for example of temporary feathering, for the order of several seconds, of the blades of the fan 7, said feathering giving rise to the actuation of said blower.

This control of the ventilation system could also take place by cutting the electrical or hydraulic supply of the motor means by which the system is constituted by a fan or a turbine electrically or hydraulically controlled.

As another control parameter of the electrovalve 17, let also be taken the control of the injection pump of the motor, the fan 7 being driven by this same motor.

Thus in this case, the regime of the fan is directly connected to the control of said injection pump.

The orientation of the grooves 10 relative to the cowl 1 could be different, as well as the emplacement of the blower along one of the sides of the frame 11.

If the grooves 10 have a great length, it is possible that there could be a blower at each end, the two operating alternately.

Finally, the invention is obviously not limited to the embodiments shown and described above, but on the contrary covers all variance, both as to shape, dimensions and arrangements of the grooves, the frame and the blower for the filtration grille 2, as well as the emplacement of this latter on the engine according to the nature of the emplacement of the radiator to be provided and the type of air impulsion, by suction or propulsion.

Similarly, modifications can be envisaged as to the actuating means of the blower or blowers, as well as the control parameter connected to the speed of rotation of the fan for forcing the cooling air.

What is claimed is:

1. Apparatus for controlling the cleaning of a grille for filtering cooling air of a radiator of an engine in which the cooling air is forced with the aid of a ventilation system; the apparatus comprising:

a filtration grille having a transverse cross-section of undulant profile forming a plurality of channel-shaped grooves;

a tangential jet cleaner assembly disposed on at least one side of the grille;

a reserve of compressed air fluidly connected to said jet cleaner assembly via an electromechanical control device;

said jet cleaner assembly having a plurality of jets structured and arranged to sweep the grooves; and said control device being operatively connected to means for controlling operation of the jet cleaning assembly as a function of the regime or of the flow of the ventilation system; when said regime of flow is reduced to zero or almost zero.

2. The apparatus according to claim 1, further comprising a backup alarm electrically connected to a speed selector; said ventilation system being actuated by the engine motor; said means for controlling operation comprising a timer adapted to actuate for a predetermined time a relay for supplying an electrovalve permitting sending air under pressure into said jet cleaner assembly; said timer being actuated by a signal generated by the speed selector, such that the jet cleaner assembly will be actuated each time the selector is actuated for reverse movement, which is to say concomitantly with a minimum regime of said ventilation system, the engine motor being decelerated.

3. The apparatus according to claim 1, further comprising a backup alarm electrically connected to a speed selector; said ventilation system being operated independently of the engine motor; said means for controlling operation comprising a timer adapted to activate a relay for supplying an electrovalve permitting sending air under pressure into said jet cleaner assembly; said timer being actuated by a signal generated by the speed selector, such that the jet cleaner assembly will be operated each time the selector is actuated for reverse movement; said signal generated by the speed selector controlling a) the actuation of said electrovalve, and b) a momentary stopping of said ventilation system; the control of the electrovalve being separate from that of the ventilation system.

4. The apparatus according to claim 1, wherein the ventilation system is actuated by a first motor independently of the engine motor; the means for controlling operation comprising an electrovalve permitting sending air under pressure into said jet cleaner assembly; the electrovalve being actuated from a speed detector operatively associated with said first motor driving the ventilation system, under the periodic control of a timer for momentarily stopping said first motor.

5. The apparatus according to claim 1, wherein the ventilation system is operated independently of the engine motor; the means for controlling operation comprising an electrovalve permitting sending air under pressure into said jet cleaner assembly, triggered from a preprogrammed control of said ventilation system.

6. The apparatus according to claim 5, wherein said ventilation system comprises a fan having a plurality of blades, and said control of the ventilation system is a temporary feathering, on the order of several seconds, of the blades of the fan; said feathering actuating said jet cleaner assembly, or stopping on the order of several seconds the motor of said ventilation system.

7. The apparatus according to claim 2, wherein the jet cleaner assembly is actuated only if the pressure of the air in said reserve is above a predetermined level.

8. The apparatus according to claim 1, wherein the filtration grille comprises a perforated metal plate fixed on a frame.

9. The apparatus according to claim 8, wherein said frame is connected to the engine, in line with inlet air louvers for cooling.

\* \* \* \* \*